(12) United States Patent
Matsumoto

(10) Patent No.: US 6,445,436 B1
(45) Date of Patent: *Sep. 3, 2002

(54) DEVICE FOR SEALING A LIQUID CRYSTAL INJECTION HOLE OF A LIQUID CRYSTAL CELL

(75) Inventor: Yoshiie Matsumoto, Tokyo (JP)

(73) Assignee: Lan Technical Service Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/576,253

(22) Filed: May 24, 2000

(51) Int. Cl.$^7$ .................... G02F 1/1339; G02F 1/1341
(52) U.S. Cl. .................... 349/153; 349/189; 349/190
(58) Field of Search ............................ 349/153, 189, 349/190; 141/4, 5, 21, 70, 31, 100, 65; 156/109, 285; 445/60

(56) References Cited

U.S. PATENT DOCUMENTS

| 5,629,787 | A | * | 5/1997 | Tsubota et al. ............. 349/153 |
| 5,725,032 | A | * | 3/1998 | Oshima et al. ............... 141/70 |
| 6,055,035 | A | * | 4/2000 | von Gutfield et al. ...... 349/187 |
| 6,099,672 | A | * | 8/2000 | Yamazaki et al. .......... 156/109 |
| 6,118,509 | A | * | 9/2000 | Miyake ....................... 349/153 |
| 6,128,066 | A | * | 10/2000 | Yokozeki ..................... 349/187 |

FOREIGN PATENT DOCUMENTS

| JP | 59058416 | 4/1984 |
| JP | 02144514 | 6/1990 |
| JP | 06075233 | 3/1994 |
| JP | 7-20480 | 1/1995 |
| JP | 07-005405 A | * 1/1995 |
| JP | 08-006040 A | * 1/1996 |
| JP | 08043837 | 2/1996 |
| JP | 09274191 | 10/1997 |
| JP | 11153801 | 6/1999 |
| JP | 2000-89238 | 3/2000 |

* cited by examiner

Primary Examiner—William L. Sikes
Assistant Examiner—Tarifur R. Chowdhury
(74) Attorney, Agent, or Firm—Wenderoth, Lind & Ponack, L.L.P.

(57) ABSTRACT

A liquid crystal sealing device which supplies sealing material for sealing liquid crystal injection holes of sealing areas of a multiplicity of liquid crystal cells simultaneously. This device has a multiplicity of pins which are arranged to match the arrangement of the sealing areas of the multiplicity of liquid crystal cells so that the sealing material can be transferred from a container storing the sealing material to the corresponding sealing area of the liquid crystal cell. This device also has a reciprocating mechanism for reciprocating the multiplicity of pins, as one unit, between a position where the sealing area is to be positioned and the container. This device also has a vertical micro-motion mechanism which minutely moves each one of the multiplicity of pins vertically, with the position, which is designed to be the position for attaching the sealing material to the sealing area, as the center, and a horizontal micro-motion mechanism which minutely moves each one of the pins horizontally, with this designed position as the center.

9 Claims, 12 Drawing Sheets

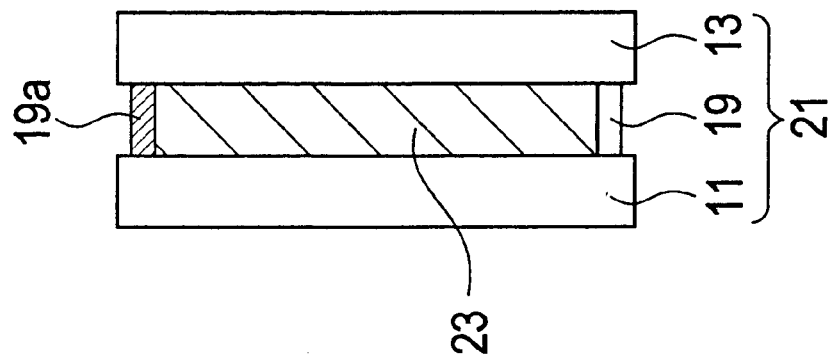
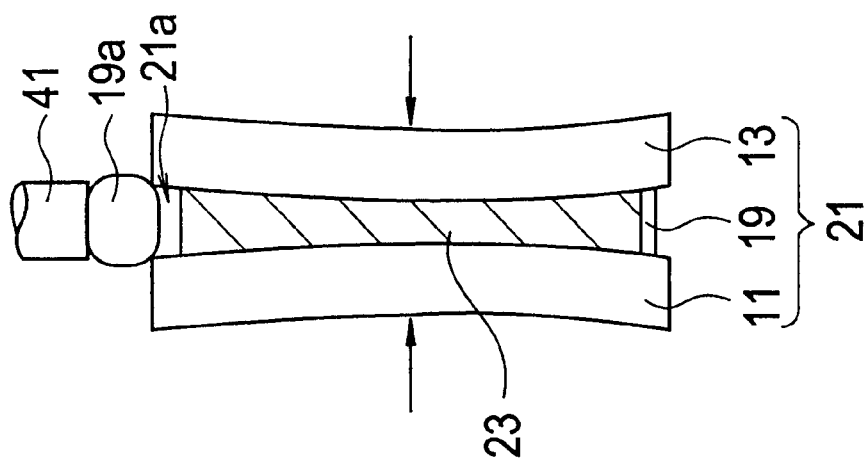
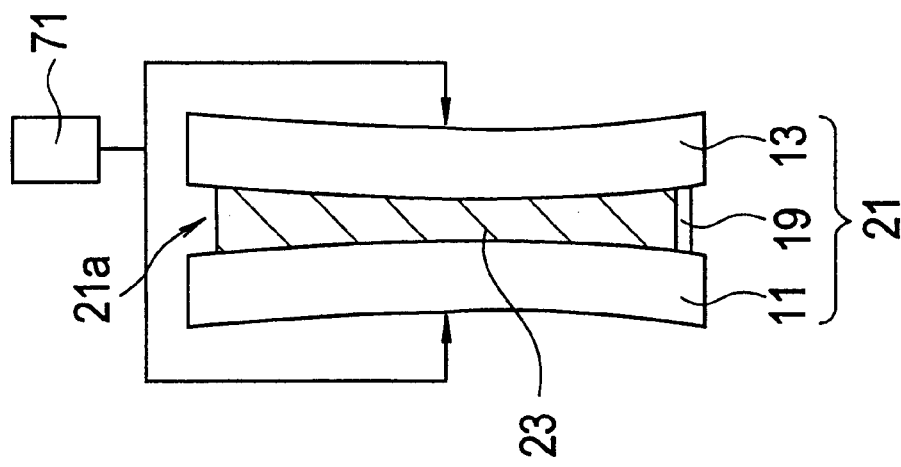

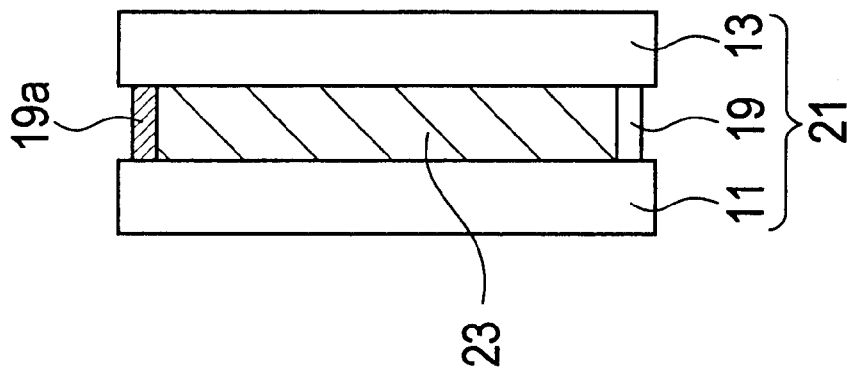
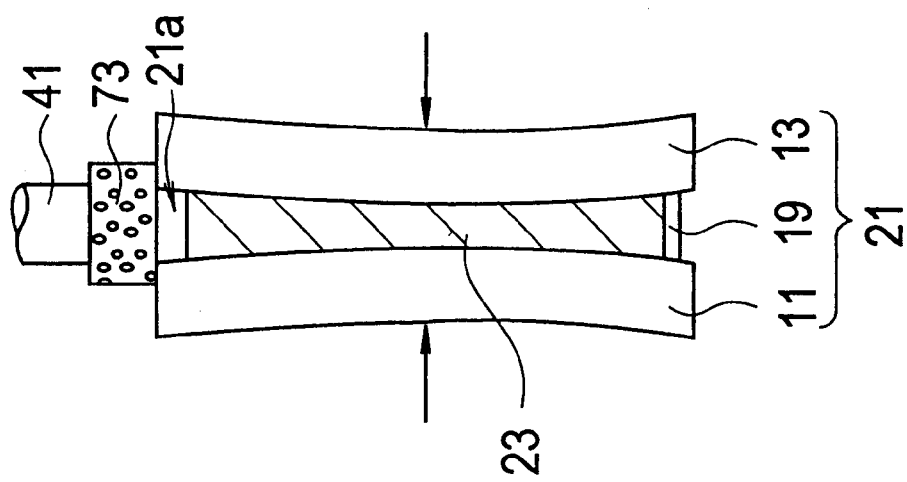
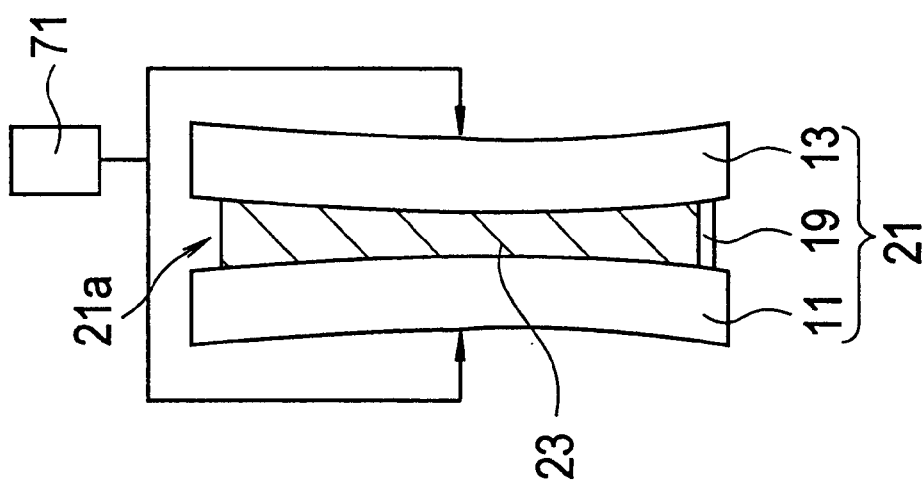

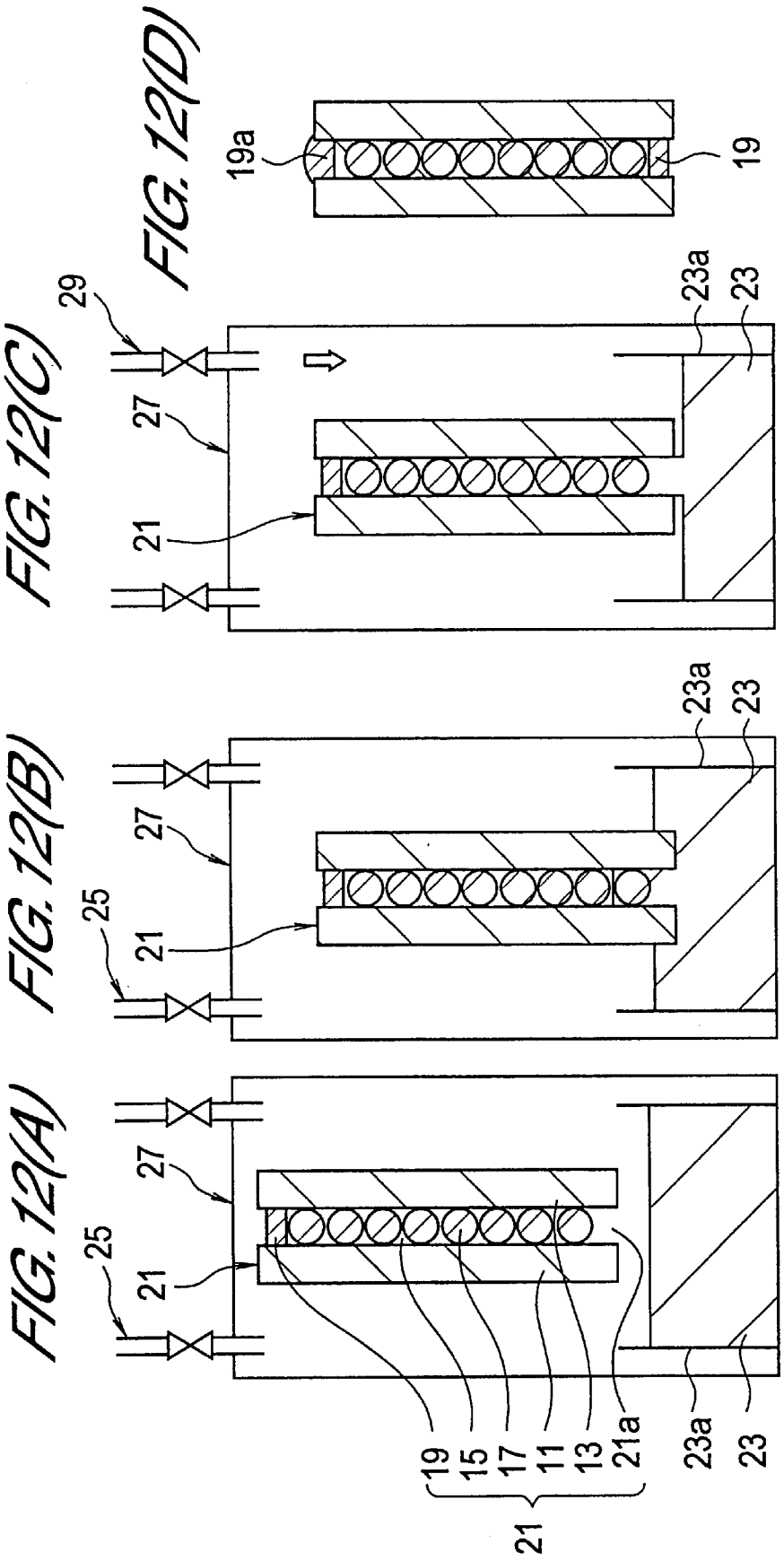

DEVICE FOR SEALING A LIQUID CRYSTAL INJECTION HOLE OF A LIQUID CRYSTAL CELL

BACKGROUND OF THE INVENTION

1. Field of the Invention

The present invention relates to a device for sealing a liquid crystal injection hole of a liquid crystal cell when liquid crystal injection has been completed.

DESCRIPTION OF RELATED ART

Liquid crystal panels are frequently used as simple display devices and are a strong candidate to be implemented as display devices, replacing CRTs (Cathode Ray Tubes). A conventional method to manufacture such a liquid crystal panel is disclosed, for example in document 1 ("Latest liquid crystal technology", Institute for Industrial Research (Sep. 1, 1984), pp. 156–167). FIGS. 12(A)–12(D) are drawings depicting this method. FIGS. 12(A)–12(D) in particular, show the liquid crystal injection step and the step of sealing a liquid crystal injection hole.

In this method, a first substrate 11 and a second substrate 13 for a liquid crystal panel where electrodes, elements for driving liquid crystals, and an orientation film (all not illustrated), are bonded with a sealing material 19, maintaining a predetermined gap 15 between the substrates (generally, the gap 15 is created by spacers 17). In this way, a crystal cell 21 (liquid crystal is not yet injected) is created (FIG. 12(A)). In a part of the crystal cell 21, a crystal injection hole 21a is created by, for example, creating a part that the sealing material does not coat in the sealing material coating step.

Then, inside the gap 15 of the crystal liquid cell 21 and liquid crystal 23, which is prepared to be injected into the gap, are degassed by exhaust means 25 (FIG. 12(A)). In FIG. 12(A), 23a is a tank for storing the liquid crystal 23, and 27 is a processing chamber to inject the liquid crystal 23 into the gap 15 of the liquid crystal cell 21. Then, this liquid crystal cell 21 is moved so that the liquid crystal injection hole 21a contacts the liquid crystal 23 (FIG. 12(B)). The processing chamber 27 is exhausted which ends at an appropriate time. When the liquid crystal injection hole 21a contacts the liquid crystal 23, the liquid crystal 23 is injected, to a degree, into the gap 15 by a capillary phenomenon (FIG. 12(B)).

Then, sufficiently dried inactive gas, such as argon or nitrogen, is supplied into the processing chamber 27 from gas supply means 29, and the liquid crystal fills the gap 15 of the liquid crystal cell 21 due to the pressure of the inactive gas (FIG. 12(C)).

Then, the liquid crystal injection hole 21a is closed (sealed) with an appropriate sealing material 19a (FIG. 12(D)). In this way, the injection of the liquid crystal and the sealing of the liquid crystal injection hole are completed.

To increase the productivity of liquid crystal panels, it is preferable to execute each process required for manufacturing liquid crystal panels in units of a large number of liquid crystal cells (in lot units). This is also true for the process to seal the liquid crystal injection hole of a liquid crystal cell after the completion of liquid crystal injection. In other words, it is better to seal the liquid crystal injection holes 21a in units of a large number of liquid crystal cells. This is because the processing time can be dramatically decreased as compared with a case of supplying the sealing material to the sealing areas of liquid crystal cells one by one (see the later mentioned FIG. 2(A)).

To execute the sealing operation in units of a large number of liquid crystal cells, it is preferable to supply the sealing material to the sealing areas of those liquid crystal cells simultaneously. Otherwise, if the sealing material is supplied to the sealing areas of a multiplicity of liquid crystal cells one by one, which takes time, the difference in time causes problems. For example, in some liquid crystal cells of the multiplicity of liquid crystal cells, the sealing material reaches the liquid crystal in the liquid crystal cells. In this case, a problem such as display quality deterioration occurs.

A possible device to supply the sealing material to the sealing areas of individual liquid crystal cells simultaneously is a device where a same number of dispensers (device to sequentially supply a predetermined quantity of viscous material utilizing gas pressure, a typical example is a syringe) as a number of sealing areas are arranged matching the arrangement of the multiplicity of liquid crystal cells, so that the sealing material can be simultaneously supplied to the sealing areas of individual liquid crystal cells using these dispensers.

In this case, however, there are problems such as the device becoming relatively large in scale, and the maintenance of the dispensers being troublesome.

With the foregoing in view, a liquid crystal sealing device with a new configuration which simultaneously supplies the sealing material to the sealing areas to seal the liquid crystal injection holes of multiplicity of liquid crystal cells respectively is desired.

SUMMARY OF THE INVENTION

Therefore, according to a first aspect of the present invention, there is provided a liquid crystal sealing device comprising a sealing material supply part for supplying sealing material simultaneously to a sealing area for sealing a liquid crystal injection hole of each one of multiplicity of liquid crystal cells when liquid crystal injection has been completed. The above mentioned sealing material supply part comprises: a multiplicity of pins which are arranged to match the arrangement of the sealing areas of the multiplicity of crystal cells, and are used for transferring the sealing material from a container storing the above sealing material to each sealing area, and a reciprocating mechanism for reciprocating these multiplicity of pins as one unit between a position where the above mentioned sealing areas are to be positioned and the above mentioned container.

According to this liquid crystal sealing device, the sealing material can be simultaneously transferred to the respective sealing areas of the multiplicity of liquid crystal cells by the pin transfer system using a multiplicity of pins. Also, the transfer pins are used so that the device can be simplified and maintenance management can also be simplified compared with, for example, the dispenser system.

The following configuration is preferable to embody the present invention. That is, a substrate pressure adjustment mechanism for adjusting pressure to press the two substrates of the above mentioned liquid crystal cell in the above mentioned sealing material supply part so that the phenomenon where the above sealing material is drawn into the above mentioned liquid crystal injection hole occurs in the liquid crystal injection hole when the above mentioned sealing material is contacted to the above mentioned sealing area by the above mentioned pin. For the above mentioned reciprocating mechanism, it is preferable to use a mechanism which contacts the above mentioned sealing material to the above mentioned sealing area by the pin during the time when the required quantity of the above mentioned sealing material is drawn into the above mentioned liquid crystal injection hole by the above mentioned drawing phenomenon, and then releases the pins from the sealing area.

According to this preferred example, the sealing material is drawn into the liquid crystal injection hole, so that the liquid crystal injection hole can be sealed with the necessary minimum amount of sealing material. In other words, there is another effect of preventing the phenomenon where the liquid crystal material builds up and attaches to the side face of the liquid crystal injection hole side of the liquid crystal cell (e.g. the phenomenon shown in FIG. 12(D)). If the sealing material builds up on the side face of the liquid crystal cell, the outside dimension of the liquid crystal cell increases. Such an outside dimensional deviation should be prevented, since recently high-density packaging is required. According to this preferred example, the above mentioned outside dimensional deviation can be prevented.

To embody the present invention, it is preferable to use a porous element which can be impregnated with the above mentioned sealing material and which has elasticity at the respective tips of the above mentioned pins. It is preferable to use a substrate pressure adjustment mechanism for adjusting the pressure to press the two substrates of the above mentioned liquid crystal cells, so that the phenomenon where the above mentioned sealing material is drawn into the above mentioned liquid crystal injection hole occurs at the liquid crystal injection hole when the porous element is contacted to the above mentioned sealing area. It is preferable that the above mentioned reciprocating mechanism contact the above mentioned porous element with the above mentioned sealing area during the time when the required quantity of the above mentioned sealing material is drawn from the above mentioned porous element into the above mentioned liquid crystal injection hole by the above mentioned drawing phenomenon.

According to this preferred example, only the sealing material drawn by the above mentioned drawing phenomenon is drawn from the porous element into the liquid crystal injection hole. Therefore, compared with the above mentioned preferred example, which simply uses the pins and the drawing phenomenon, the unnecessary attachment of sealing material on the side wall of the liquid crystal cell can be more completely prevented.

In the above description, examples where the porous elements are disposed at the tips of multiplicity of pins corresponding to the multiplicity of liquid crystal cells were described, but it is also possible not to use the pins.

In other words, according to a second aspect of the present invention, there is provided a liquid crystal sealing device, and as later described with reference to FIG. 11, wherein the porous elements are arranged to match the arrangement of the sealing areas of the multiplicity of liquid crystal cells. For example, a porous element which has a shape covering the sealing areas of the multiplicity of liquid crystal cells is used, or an appropriate support, a frame for example, which covers the sealing areas of the multiplicity of liquid crystal cells, is provided, and each porous element is disposed at the areas facing the sealing areas of the multiplicity of liquid crystals cells on this frame.

The concept of drawing the sealing material into the liquid crystal hole using the porous element, can certainly be applied to a case when a liquid crystal injection hole of one liquid crystal cell is sealed, and is not limited to the case when individual liquid crystal injection holes of the multiplicity of liquid crystal cells are sealed simultaneously.

In other words, according to a third aspect of the present invention, there is provided a liquid crystal sealing device comprising a sealing material supply part for supplying sealing material to a sealing area for sealing the liquid crystal injection hole of a liquid crystal cell where liquid crystal injection has been completed, wherein the above mentioned sealing material supply part further comprises: a porous element which can be impregnated with the above mentioned sealing material and which has elasticity; a substrate pressure adjustment mechanism for adjusting the pressure to press the two substrates of the above mentioned liquid crystal cell so that the phenomenon where the above mentioned sealing material in the porous element is drawn into the above mentioned liquid crystal injection hole occurs at the liquid crystal injection hole when the above mentioned porous element is contacted to the above mentioned sealing area; and a porous element moving mechanism which operates such that the above mentioned porous element is contacted to the above mentioned sealing area during the time when a required quantity of the above mentioned sealing material is drawn from the above mentioned porous element into the above mentioned liquid crystal injection hole by the above mentioned drawing phenomenon, and is then released. According to this, the sealing material is injected only into the liquid crystal injection hole, even when one liquid crystal cell is sealed, so that a liquid crystal cell with a high outside dimension accuracy can be manufactured.

BRIEF DESCRIPTION OF THE DRAWINGS

The forgoing and other objects, features and advantages of the present invention will be better understood from the following description taken in connection with the accompanying drawings, in which:

FIGS. 8(A)–8(C) are drawings depicting the operation of the liquid crystal sealing device in accordance with the second embodiment;

FIGS. 10(A)–10(C) are drawings depicting an operation of the liquid crystal sealing device in accordance with the third embodiment;

FIGS. 12(A)–12(D) are drawings depicting prior art.

DESCRIPTION OF THE PREFERRED EMBODIMENTS

Figure 1:
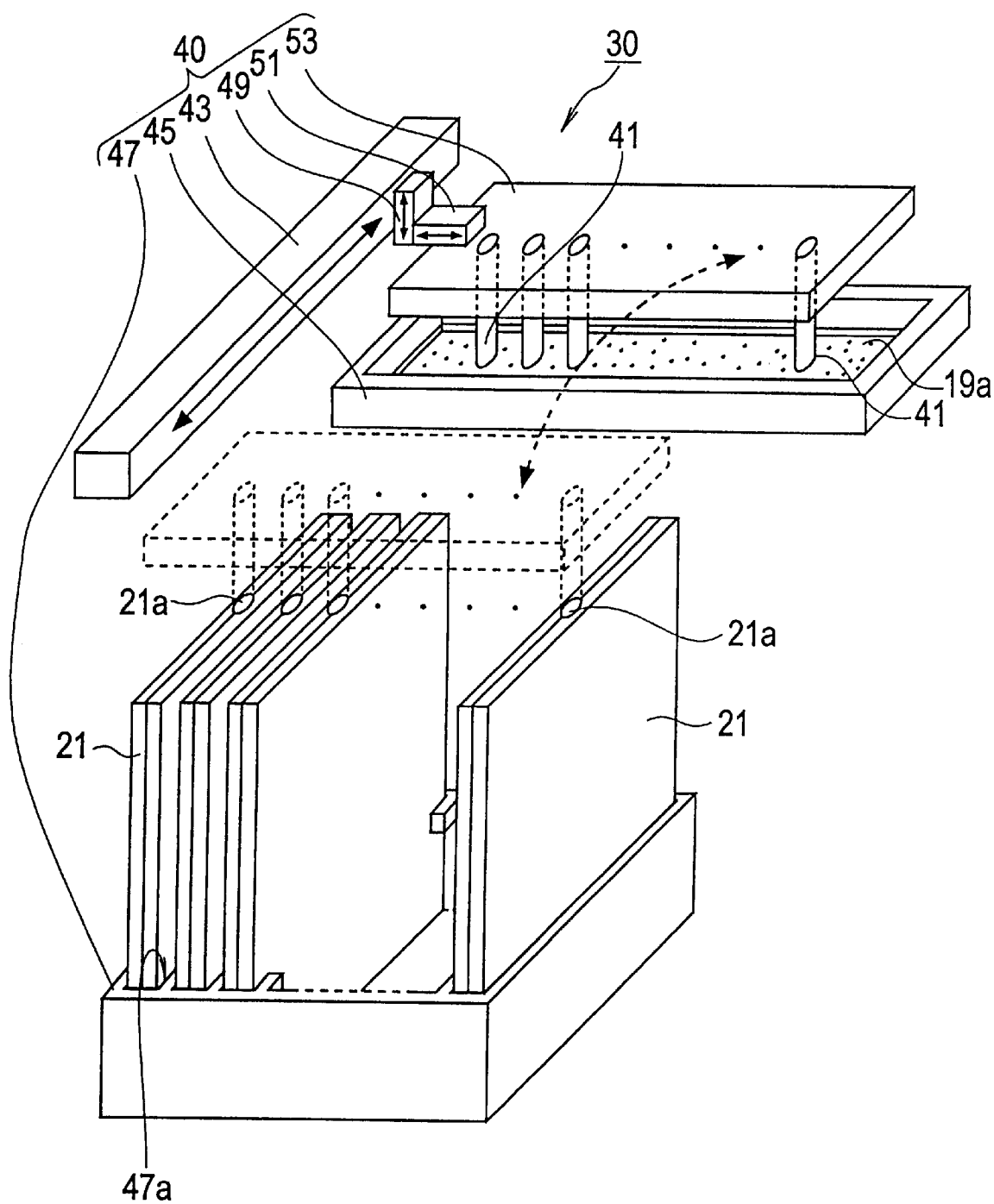
FIG. 1 is a drawing depicting a liquid crystal sealing device 30 in accordance with the first embodiment.

Embodiments of the liquid crystal sealing device of the present invention will now be described with reference to the accompanying drawings. In the drawings, similar constitutional elements are denoted by the same number, and redundant explanations are omitted.

1. First Embodiment

FIG. 1 is a perspective view depicting a liquid crystal sealing device 30 in accordance with the first embodiment. The liquid crystal sealing device 30 of the first embodiment has a sealing material supply part 40 which simultaneously supplies sealing material 19a to a sealing area R (see FIG. 2(A)) to seal a liquid crystal hole 21a of each one of a multiplicity of liquid crystal cells 21 where liquid crystal injection has been completed.

This sealing material supply part 40 comprises a multiplicity of pins 41 and a reciprocation mechanism 43 for reciprocating these pins 41. The multiplicity of pins are preferably the same number of pins as the number of sealing areas of the multiplicity of liquid crystal cells for which sealing processing is executed simultaneously. When each liquid crystal cell has two or more (n number of) liquid crystal injection holes, the number of pins 41 is preferably a number represented by the number of liquid crystal cells×n.

In the case of this embodiment, the sealing material supply part 40 has a container 45 for storing the sealing material 19a and a positioning part 47 for arranging the multiplicity of liquid crystal cells to be sealed in a predetermined arrangement. In some cases, however, the container 45 and the positioning part 47 may not be required for the device 30, and parts of other equipment may be used instead. For the positioning part 47, in particular, a carrier jig, which is commonly used with other steps, may be used.

In the case of this embodiment, the sealing material supply part 40 also has a vertical micro-motion mechanism 49 and a horizontal micro-motion mechanism 51. As described later, it is preferable to use these micro-motion mechanisms 49 and 51 in order to uniformly supply the sealing material 19a to the sealing area of each liquid crystal cell respectively.

One or both of these micro-motion mechanisms 49 and 51, however, need not be used, if the sealing material 19a can be supplied to the liquid crystal cells without these micro-motion mechanisms. Each constituting element 41–51 will now be described.

The multiplicity of pins 41 are arranged to match the arrangement of the sealing areas R of the multiplicity of liquid crystal cells for which sealing processing is executed simultaneously. These pins are also for transferring the sealing material 19a from the container 45, where the sealing material 19a is stored, to each sealing area R.

The sealing area R here means a predetermined area around the liquid crystal injection hole 21a in the liquid crystal cell 21, including the liquid crystal hole 21a itself, as shown in FIG. 2. The size of the sealing area is set in accordance with the design. If one liquid crystal cell 21 has a plurality of liquid crystal injection holes 21a, the sealing area R is set for each one of these injection holes.

Each pin 41 is made of any appropriate material, such as metal, plastic or ceramic. It is preferable that each pin 41 be made of metal, in terms of durability and easy processability.

Each pin 41 is fixed in a predetermined arrangement on a base plate (a plate to be the base) 53, which is provided separately (see FIG. 1). This base plate 53 can be made of any appropriate material, such as metal, plastic or ceramic. However, it is preferable that the base plate 53 be made of metal, in terms of durability and easy processability.

Each pin 41 has preferably a polygonal prism or cylindrical (including an elliptic cylindrical) shape. A cylindrical pin is more preferable. This is because a cylindrical pin is suitable to supply the sealing material 19a and because a commercial pin can be used.

It is preferable that each pin 41 is a pin having a tip face at the liquid crystal side 21 which has an area suitable for transferring the sealing material 19a to the sealing area R.

It is preferable that each pin 41 has a pin which tip contacts the sealing area R of the liquid crystal cell 21, and which includes a buffering mechanism for insuring the contact between the pin 41 and the sealing area R of the liquid crystal cell 21, and for relaxing the action and reaction between the pin and the liquid crystal cell.

Figure 3:
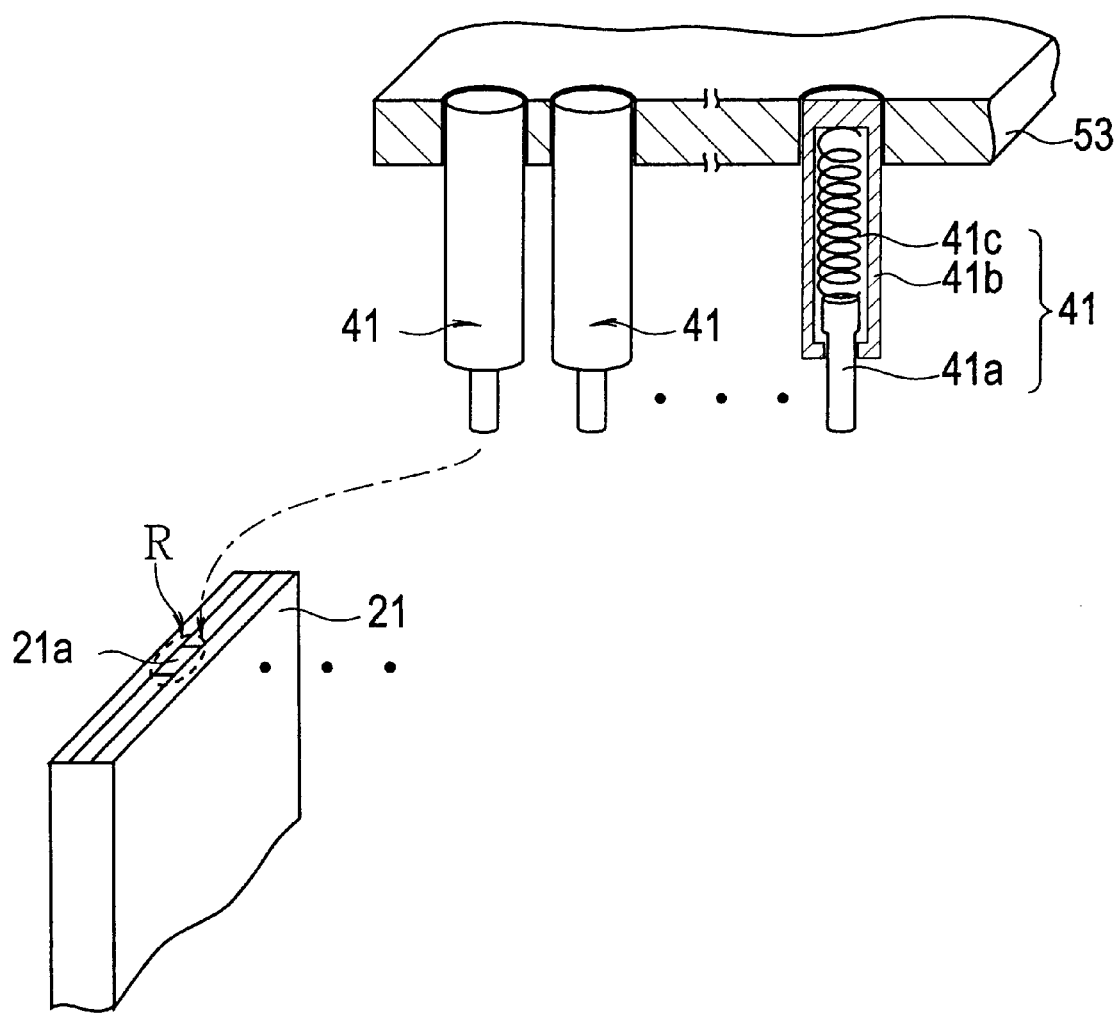
FIG. 3 is a drawing depicting a configuration example of a pin having a buffering mechanism.

FIG. 3 is a drawing depicting one configuration example of the buffering mechanism. This is a perspective view with a cross-section showing the base plate 53 where the pins 41 are mounted and a part of the pins 41.

Each pin 41 in this case is comprised of a cylindrical first element 41a, which contacts the sealing area R of the liquid crystal cell 21, a tubular second element 41b with the top end closed, which has inner diameter slightly larger than the outer diameter of the first element 41a, and which envelops a part of the first element 41a, and the buffer element 41c (e.g. spring), which is contained inside the second element 41b.

The dimensional relationship between the first element 41a and the second element 41b is determined so that the first element 41a can move linearly in the longitudinal direction inside the second element 41b. Also, one end of the spring, which is the buffer element 41c, contacts one end (the opposite side of the liquid crystal cell side) of the first element 41a, and the other end of the spring contacts the second element 41b.

When the first element 41a contacts the sealing area R of the liquid crystal cell 21, the buffer element 41c shrinks due to the pressure, so that the first element 41a is pushed into the second element 41b. Therefore, the action and reaction between the pin 41 and the liquid crystal cell 21 can be relaxed while insuring the contact between the pin 41 and the sealing area R of the liquid crystal cell 21.

As a pin having such a buffering mechanism, a pin originally created for this liquid crystal sealing device 30 may be used, but a probe, for example, which is used for a wafer prober (also called an "IC tester") for semiconductor equipment, may be used as the pin 41. This is because a probe used for a wafer prober has the above mentioned buffering mechanism, so pins dedicated to the liquid crystal sealing device need not be fabricated.

The structure of the pin having a buffering mechanism is certainly not limited to the example in FIG. 3, but can have any structure with a buffering effect.

The reciprocating mechanism 43 is a mechanism to reciprocate the above mentioned plurality of pins 41 as a whole between the position where the sealing area R of each liquid crystal cell 21 is positioned and the container 45. In this embodiment, each pin 41 is reciprocated as mentioned above, by reciprocating the base plate 53 between these locations.

The configuration of this reciprocating mechanism 43 is not restricted as above. This reciprocating mechanism 43 can be implemented by any reciprocating mechanism which can execute reciprocation according to the present invention. For example, the reciprocating mechanism can be comprised of any moving means (e.g. mechanism which includes a hydraulic cylinder and/or arm mechanism) which moves the base plate 53 (in the case of the example in FIG. 1, the vertical micro-motion mechanism 49, the horizontal micro-mechanism 51 and the base plate 53) as mentioned above, and a sensor to detect the moving position of the base plate 53.

The container 45 is a container to store the sealing material 19a. This container 45 has an opening area which is wider than the plane area where the above-mentioned plurality of pins 41 occupy, and has a depth to allow storing the required quantity of the sealing material 19a. This container 45 can be made of any material which does not react with the sealing material 19a. For example, metal, plastic or an inorganic material can be selected. The sealing material 19a can be any suitable material, but an ultra-violet hardening type adhesive is preferable. This is because an ultra-violet hardening type adhesive has advantages such as handling is relatively easy, hardening time is short, and disturbance to the liquid crystal cells, such as by thermal influence, hardly occurs.

The positioning part 47 may be any means which arranges the plurality of liquid crystal cells 21 at a predetermined pitch. Typically a jig which has a guide part 47a to which liquid crystal cells 21 are inserted and which positions the liquid crystal cells 21 can be used. Setting the plurality of liquid crystal cells 21 in the positioning guide part 47 results in the arrangement of the sealing areas R of the plurality of liquid cells 21, at a predetermined pitch.

The vertical micro-motion mechanism 49 vertically moves each one of the pins 41 with respect to a position, which is designed to be a position where the sealing material 19a can be attached to the sealing area R, as a central point. The horizontal micro-motion mechanism 51 horizontally moves each one of the pins 41 with the respect to the above-mentioned designed position P as a central point.

Figure 2A:
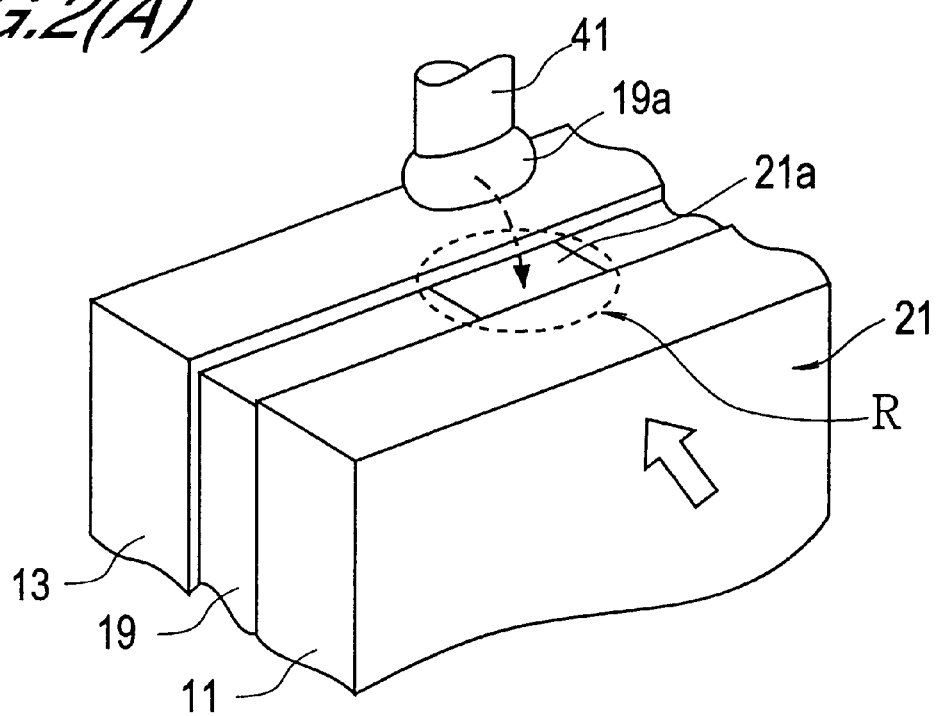
FIGS. 2(A) and 2(B) are drawings depicting the sealing area R and the position P which is a position designed to attach the sealing material to the sealing area R.
Figure 2B:
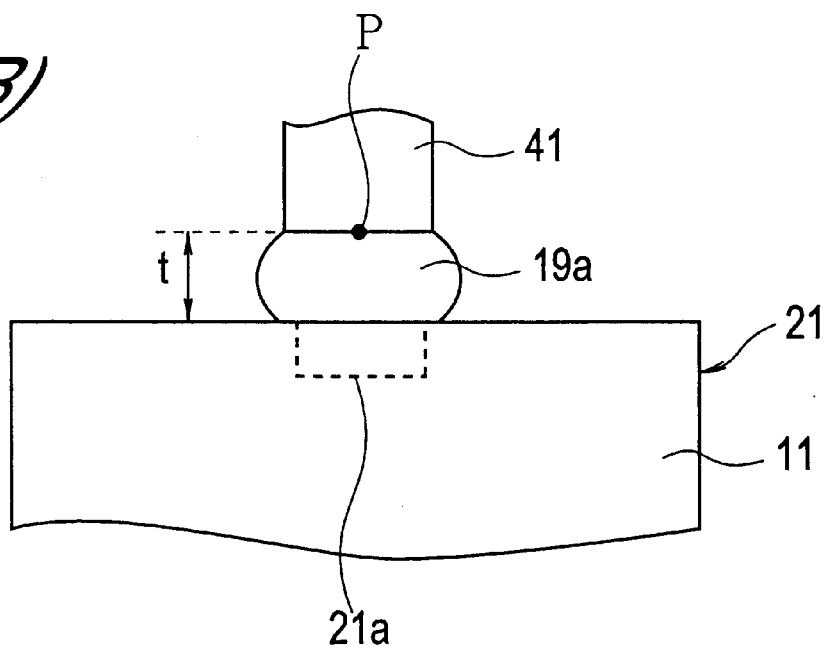

FIG. 2(B) is a drawing depicting the above-mentioned designed position P. FIG. 2(B) is a drawing when FIG. 2(A) is viewed from the direction of the arrow shown in FIG. 2(A). (That is, the side viewed from the first substrate 11 or the second substrate 13 side of the liquid crystal cell 21.)

The designed position P is any position which is above the sealing area R of the liquid crystal cell 21, and which contacts the liquid crystal cell 21 or is at a location which is distant from the liquid crystal cell 21 at a predetermined interval. In the example in FIG. 2(B), the designed position P is a position which is distant from the liquid crystal cell 21 at predetermined interval t.

The vertical micro-motion mechanism 49 minutely moves the pin 41 for plus/minus ($\pm$)y (0<y<an arbitrary value) with this position P at the center. The horizontal micro-motion mechanism 51 minutely moves the pin 41 for plus/minus ($\pm$)x(0<X<an arbitrary value) with this position P at the center. The horizontal direction is any direction on the plane which is orthogonal to the above-mentioned vertical direction. A direction along the thickness direction of the liquid crystal cell, or a direction orthogonal to this thickness direction, or both of these directions is preferable.

Figure 4A:
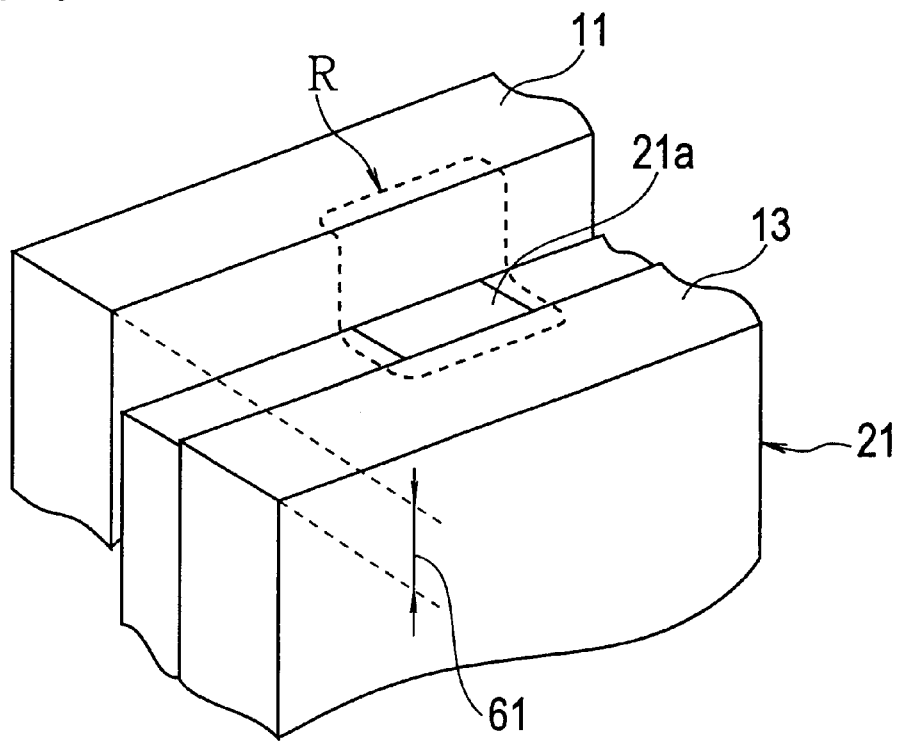
FIGS. 4(A) and 4(B) are drawings depicting the reason why it is better to use a vertical micro-motion mechanism and a horizontal micro-motion mechanism.
Figure 4B:
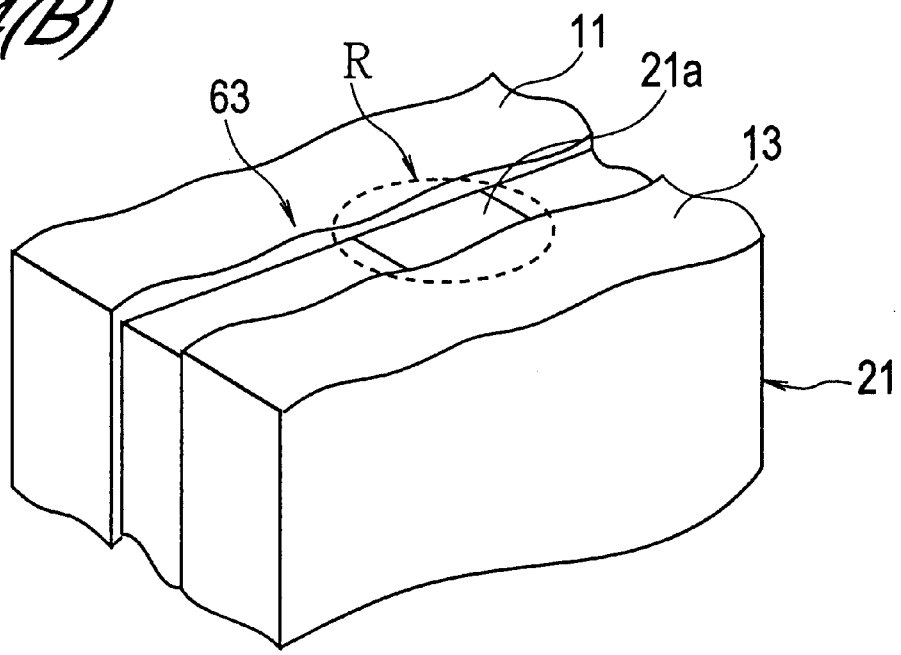

It is preferable to use one or both of the vertical micro-motion mechanism 49 and the horizontal micro-motion mechanism 51 for the following reason, described with reference to FIGS. 4(A) and 4(B).

In the liquid crystal cell 21, the bonding position between the first substrate 11 and the second substrate 13 may deviate from the predetermined position due to, for example, manufacturing dispersion. Then, a step difference 61 occurs in the sealing area R, as shown in FIG. 4(A), due to the positional deviation of the first substrate 11 and the second substrate 13. Also, when a substrate having relatively large bumps 63 on the end face is used for the first substrate 11 or second substrate 13 to create the liquid crystal cell 21, as shown in FIG. 4(B), a step difference occurs to the sealing area R due to these bumps.

When such a step difference occurs to the sealing area R, the sealing material 19a may not be attached as desired in the sealing area R. If the vertical micro-motion mechanism 49 and/or the horizontal micro-motion mechanism 51 is disposed as in this preferred embodiment, correction can be made after the sealing material 19a is attached to the sealing area R, even if the sealing area R has a step difference, so that the sealing material 19a can be more easily and evenly supplied to the sealing area R.

When such a vertical micro-motion mechanism 49 and/or horizontal micro-motion mechanism 51 is disposed, it is preferable that the pin 41 is a pin which includes the above-mentioned buffering mechanism (see FIG. 3). If the pin 41 having such a buffering mechanism is used, the pin 41 contacts the liquid crystal cell 21 with a relatively weak shock, even if a vertical micro-motion or horizontal micro-motion is applied while the pin 41 is contacting the liquid crystal cell 21. Therefore, damage to the liquid crystal cell 21 or damage to the pin 41 can be prevented.

The vertical micro-motion mechanism 49 and the horizontal micro-motion mechanism 51 in this case are structured such that the base plate 53 is minutely moved. Because of this, each pin 41 can be minutely moved a predetermined distance in the desired direction.

The configuration of the vertical micro-motion mechanism 49 and the horizontal micro-motion mechanism 51 is not particularly restricted. Each one of the vertical micro-motion mechanism 49 and the horizontal micro-motion mechanism 51 can be implemented by any micro-motion mechanism which can execute micro-motion in accordance with the present invention. For example, a micro-motion mechanism comprising a cylinder (not illustrated) to minutely move the base plate 53 and a guide part (not illustrated) to guide the movement of the base plate 53, can be used.

Operation of the above mentioned reciprocating mechanism 43, vertical micro-motion mechanism 49 and horizontal micro-motion mechanism 51, can be controlled by a control device (not illustrated) of the liquid crystal sealing device 30.

To further the understanding of the liquid crystal sealing device 30 of the first embodiment, the operation thereof will now be described. FIGS. 5(A)–5(E) are referenced for the explanation.

Figure 5A:
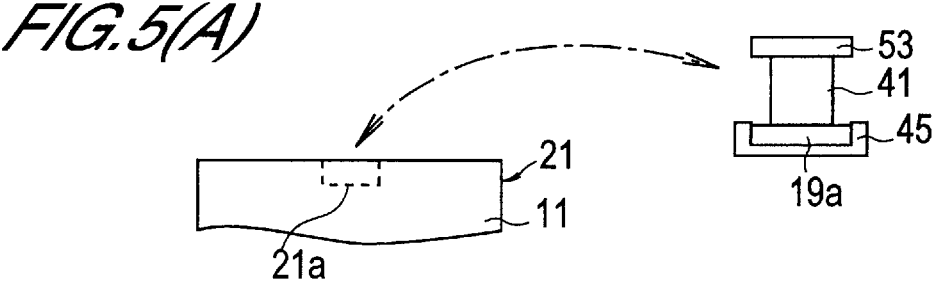
FIGS. 5(A)–5(E) are drawings depicting an example of using the liquid crystal sealing device 30 in accordance with the first embodiment.

The tip of each pin 41 is contacted to the sealing material 19a in the container 45 by the reciprocating mechanism 43 (FIG. 5(A)). In this way, the sealing material 19a attaches to the tip of each pin 41.

Figure 5B:
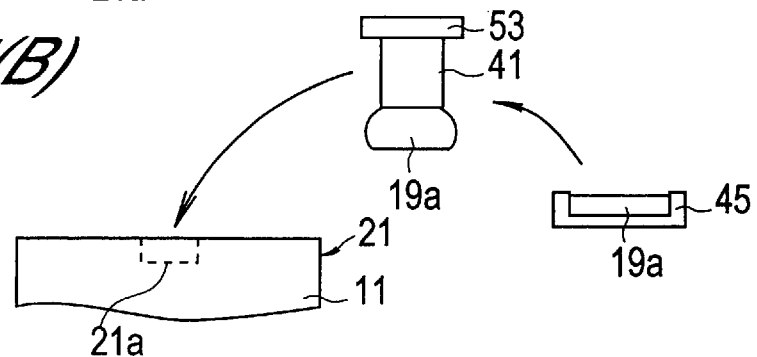
Figure 5C:
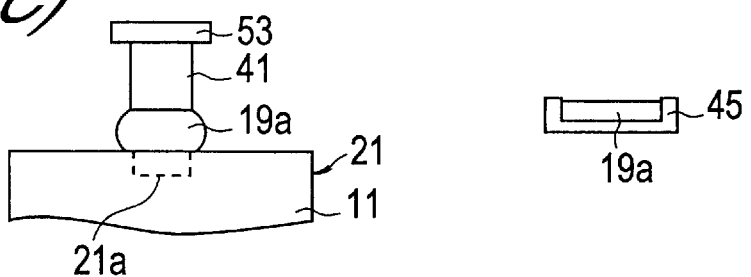

The pin 41, where the sealing material 19a is attached, is now moved to the position P (see FIG. 2(B)) designed to be the location where the sealing material 19a is attached to the sealing area R by the reciprocating mechanism 43 (FIGS. 5(B) and 5(C)). Then, the sealing material 19a attached at the tip of the pin 41 attaches to the sealing area R, so the sealing material 19a can be transferred to the sealing area R (FIG. 5(C)).

Figure 5D:
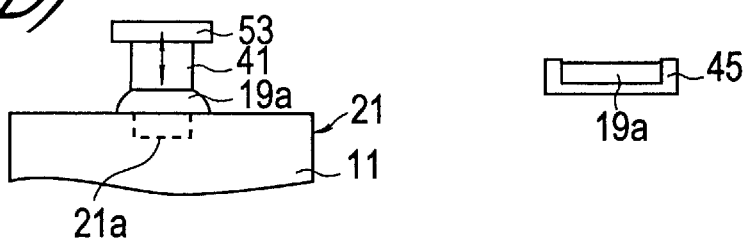
Figure 5E:
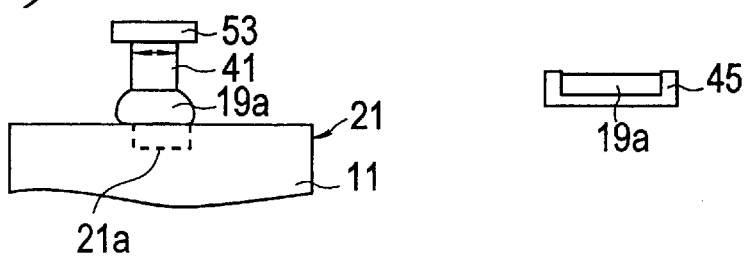

To further insure the adhesion of the sealing material 19a to the sealing area R, the pin 41 is vertically moved by operating the vertical micro-motion mechanism 49 (see FIG. 5(D)) if necessary. Also, the pin 41 is horizontally moved by the horizontal micro-motion mechanism 51 (see FIG. 5(E)) if necessary.

In this way, the sealing material 19a is attached to the sealing area R, then the sealing material 19a is hardened by a method suitable for the sealing material 19a. If this sealing material 19a is an ultra-violet hardening type adhesive, ultra-violet rays at a predetermined wavelength are simultaneously irradiated to the sealing area R of each liquid crystal cell.

2. Second Embodiment

Figure 6:
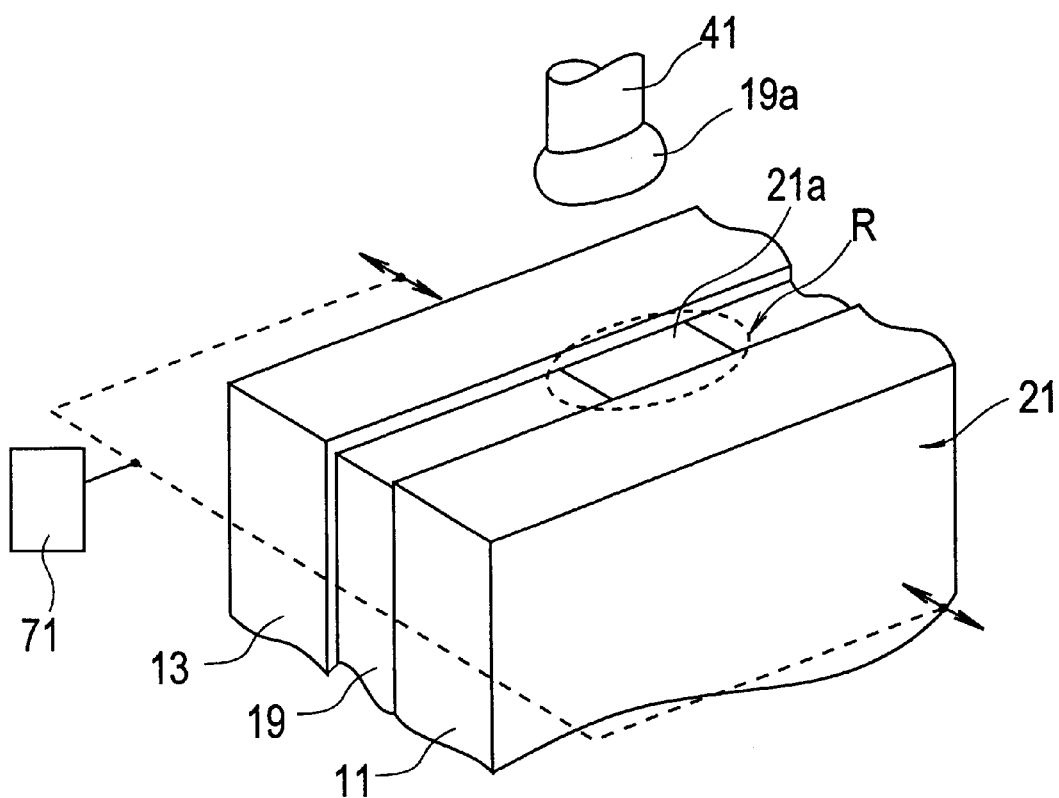
FIG. 6 is a drawing depicting a liquid crystal sealing device in accordance with the second embodiment.
Figure 7A:
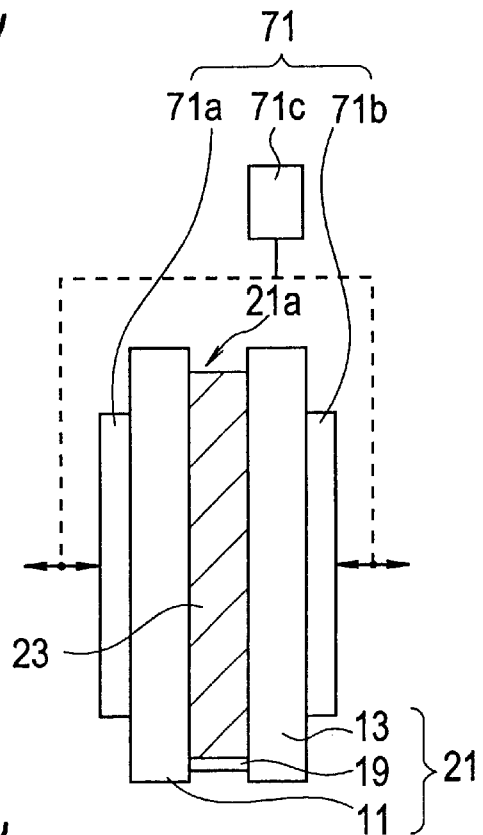
FIGS. 7(A) and 7(B) are drawings depicting examples of the substrate pressure adjustment mechanism.
Figure 7B:
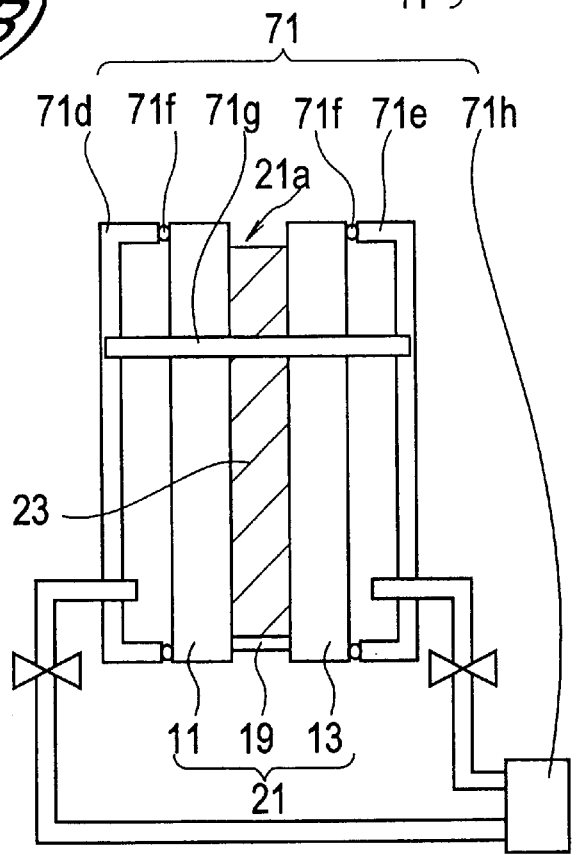

In the first embodiment, the sealing material can be supplied to the sealing area R by the pin 41. However, it is difficult to actively inject the sealing material into the liquid crystal injection hole 21a. The second embodiment improves on this. The liquid crystal sealing equipment in accordance with the second embodiment will now be described with reference to FIG. 6–FIG. 8(C). FIG. 6 is a drawing depicting the key parts of the liquid crystal sealing device of the second embodiment, FIGS. 7(A) and 7(B) are drawings depicting some examples of a substrate pressure adjustment mechanism 71, and FIGS. 8(A)–8(C) are drawings depicting the operation of the liquid crystal sealing device of the second embodiment.

The major difference of the liquid crystal sealing device of the second embodiment from the device of the first embodiment is that the substrate pressure adjustment mechanism 71 is used, and the timing when the pin 41 is contacted to the sealing area R has been improved. These points will now be described.

As FIG. 6 shows, the liquid crystal sealing device of the second embodiment has the substrate pressure adjustment mechanism 71. The substrate pressure adjustment mechanism 71 is a mechanism to press the two substrates 11 and 13 of the liquid crystal cell 21 so that the phenomenon where the sealing material 19a at the tip of the pin 41 is drawn into the liquid crystal injection hole 21a occurs at the liquid crystal injection hole 21a when the pin 41 is contacted to the sealing area R.

This substrate pressure adjustment mechanism 71 is implemented by, for example, a mechanism which presses the substrates 11 and 13 to a certain degree so as to approach each other, and releases this pressing state when the sealing material 19a at the tip of the pin 41 contacts the sealing area R. Such a mechanism 71 can be implemented by a mechanical mechanism 71 comprised of other substrates 71a and 71b which contact the center areas of the substrates 11 and 13, and a pressure part 71c, which presses the other substrates 71a and 72b at an arbitrary stroke so that the substrates 71a and 71b approach each other, or releases this pressing force as shown in FIG. 7(A). The pressure part 71c can be configured by any suitable means, such as a hydraulic cylinder. In FIG. 7(A), the liquid crystal cell 21 is illustrated showing a partial perspective view of the sealing material 19 bonding the substrates 11 and 13, so that inside the liquid crystal cell 21 can be seen. (This is the same for FIG. 7(B), FIG. 8 and FIG. 10.)

Alternatively, the above mechanism 71 is also implemented, as shown in FIG. 7(B), by a mechanism comprised of containers 71d and 71e having openings which correspond to the main face of the two substrates 11 and 13 of the liquid crystal cells 21 respectively, air tightness maintaining element 71f, support element 71g, and pressure adjustment part 71h to adjust the internal pressure of the containers 71d and 71e (a gas utilization mechanism). The openings of the two containers 71d and 71e contact the substrate 11 or 13 via the air tightness-maintaining element 71f. The two containers 71d and 71e are fixed by the support element 71g so that the two containers 71d and 71e contact the substrate 11 or 13 with good air tightness. The pressure of pressing the substrate 11 or 13 can be controlled by adjusting the internal pressure of the two containers 71d and 71e by the pressure adjustment part 71h.

The details of the above gas utilization mechanism can be implemented by using, for example, the technology described with reference to FIG. 3 in Japanese Unexamined Patent Publication No. 7–20480 applied by the same applicant as the present application, or the technology proposed in the Japanese Unexamined Patent Publication No. 2000–89238 by the same applicant as the present application. In the case of the substrate pressure adjustment mechanism utilizing gas, when the sealing material is drawn into the liquid crystal injection hole 21a, the drawing phenomenon can be generated by setting the internal pressure of the containers 71d and 71e to a somewhat more negative pressure than the conventional setting.

Operation of the liquid crystal sealing device of the second embodiment will now be described with reference to FIGS. 8(A)–(C). The change of pressure to press the two substrates 11 and 13 to draw the sealing material 19a into the liquid crystal injection hole 21a of the liquid crystal cell 21 does not need to be very great, but in FIG. 8, pressure to press the substrates 11 and 13 is exaggerated for a clear illustration.

First, the two substrates 11 and 13 of the liquid crystal cell 21 are pressed by the substrate pressure adjustment mechanism 71 in advance (FIG. 8(A)).

The sealing material 19a at the tip of the pin 41 is contacted to the sealing area R (see FIG. 6) of the liquid crystal cell 21 in a state where the two substrates 11 and 13 are pressed in this way (FIG. 8 (B)). Then the pressure pressing the substrates 11 and 13 is released. And a force to draw (suck) the above mentioned sealing material 19a is generated at the liquid crystal injection hole 21a, and the sealing material 19a is drawn into the liquid crystal injection hole 21a of the liquid crystal cell 21.

When the required quantity of sealing material 19a is drawn into the liquid crystal injection hole 21a, the pin 41 is released from the liquid crystal cell 21 by the reciprocating mechanism 43. In this way, the liquid crystal cell 21, where the sealing material 19a is in the liquid crystal injection hole 21a, can be obtained (FIG. 8(C)). This sealing material 19a is hardened by the method described in the first embodiment, and the sealing is completed.

According to the liquid crystal sealing device of the second embodiment, a build up of the sealing material on the side face of the liquid crystal cell 21 at the liquid crystal injection hole 21a side can be prevented or decreased. So, in addition to the effect by the device of the first embodiment, a new effect, that is, the outside dimension of the liquid crystal cell more easily becomes the designed dimension, can be obtained.

3. Third Embodiment

Figure 9:
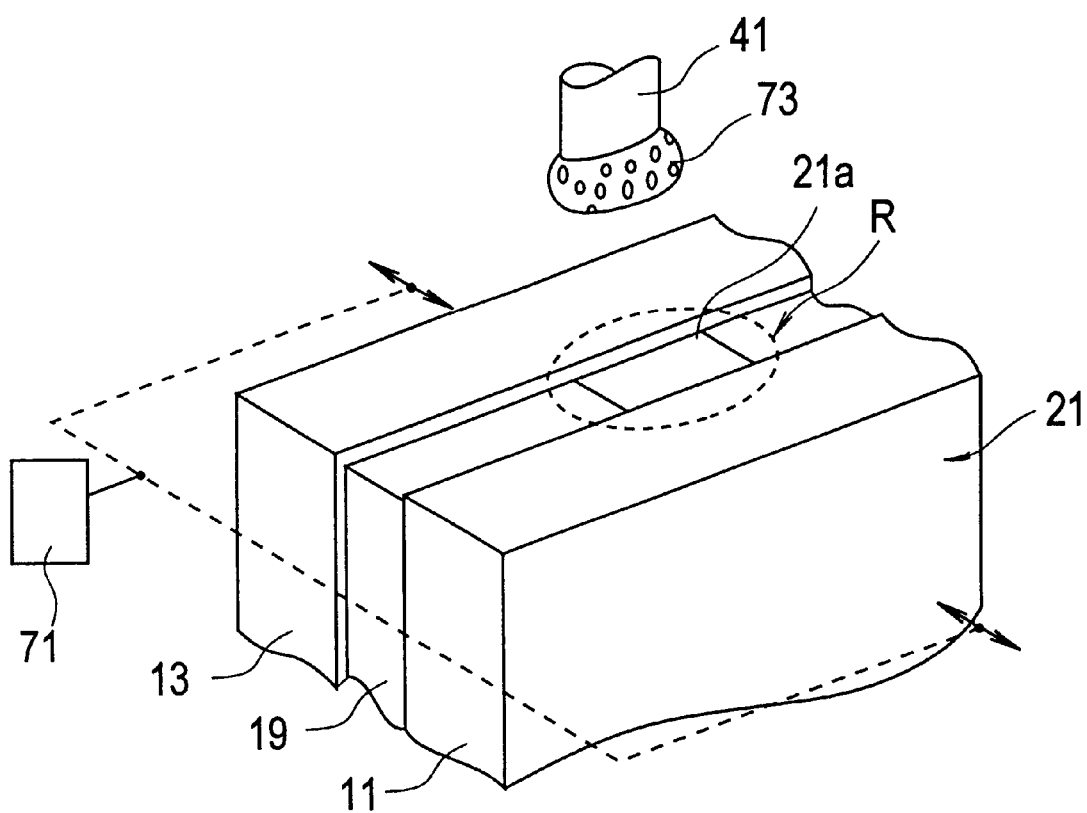
FIG. 9 is a drawing depicting a liquid crystal sealing device in accordance with the third embodiment.

In the above second embodiment, the sealing material is attached to the tip of the pin 41, and is then transferred to the sealing area R of the liquid crystal cell 21. In the liquid crystal sealing device of the third embodiment, on the other hand, a porous element 73 is disposed at the tip of each pin 41, as shown in FIG. 9. This porous element 73 can be made of any material which can be impregnated with the sealing material 19a, and which has elasticity. For such a porous element 73, porous rubber or porous resin, for example, can be used. More specifically, sponge or urethane, for example, can be used. The pore size, density of the porous element 73, and shape and thickness of the element are selected such that the sealing material can be easily supplied to the liquid crystal injection hole 21a. For example, the shape can be any shape, such as cylindrical or prismatic.

In the case of the liquid crystal sealing device of the third embodiment as well, the substrate pressure adjustment mechanism 71 is used.

Operation of the liquid crystal sealing device of the third embodiment will now be described with reference to FIGS. 10(A)–10(C). The change of pressure to press the two substrates 11 and 13 to draw the sealing material inside the porous element 73 into the liquid crystal injection hole 21a of the liquid crystal cell 21 need not be much, but in FIG. 10, the pressure to press the substrates 11 and 13 is exaggerated for a clear illustration.

First, the two substrates 11 and 13 of the liquid crystal cell 21 are pressed by the substrate pressure adjustment mechanism 71 in advance (FIG. 10(A)).

The porous element 73 is contacted to the sealing area R (see FIG. 9) of the liquid crystal cell 21 in a state where the two substrates 11 and 13 are pressed in this way (FIG. 10 (B)). Then, the pressure pressing the substrates 11 and 13 is released. As a result, a force to draw (suck) the sealing material 19a contained in the porous element 73 is generated at the liquid crystal injection hole 21a, and the sealing material 19a in the porous element 73 is drawn into the liquid crystal injection hole 21a of the liquid crystal cell 21.

When the required quantity of sealing material 19a is drawn into the liquid crystal injection hole 21a, the porous element 73 is released from the liquid crystal cell 21 by the reciprocating mechanism 43. In this way, the liquid crystal cell 21, where the sealing material 19a is in the liquid crystal injection hole 21a, can be obtained (FIG. 10 (C)). This sealing material 19a is hardened by the method described in the first embodiment, and the sealing is completed.

According to the liquid crystal sealing device of the third embodiment, when the porous element is used, it is even more difficult for the sealing material to attach to the side face of the liquid crystal cell 21 at the liquid crystal injection hole 21a side, as compared with the second embodiment. Therefore, in addition to the effect by the device of the first embodiment, a new. effect, which is, the outside dimension of the liquid crystal cell more easily becomes the designed dimension, can be obtained.

4. Fourth Embodiment

Figure 11:
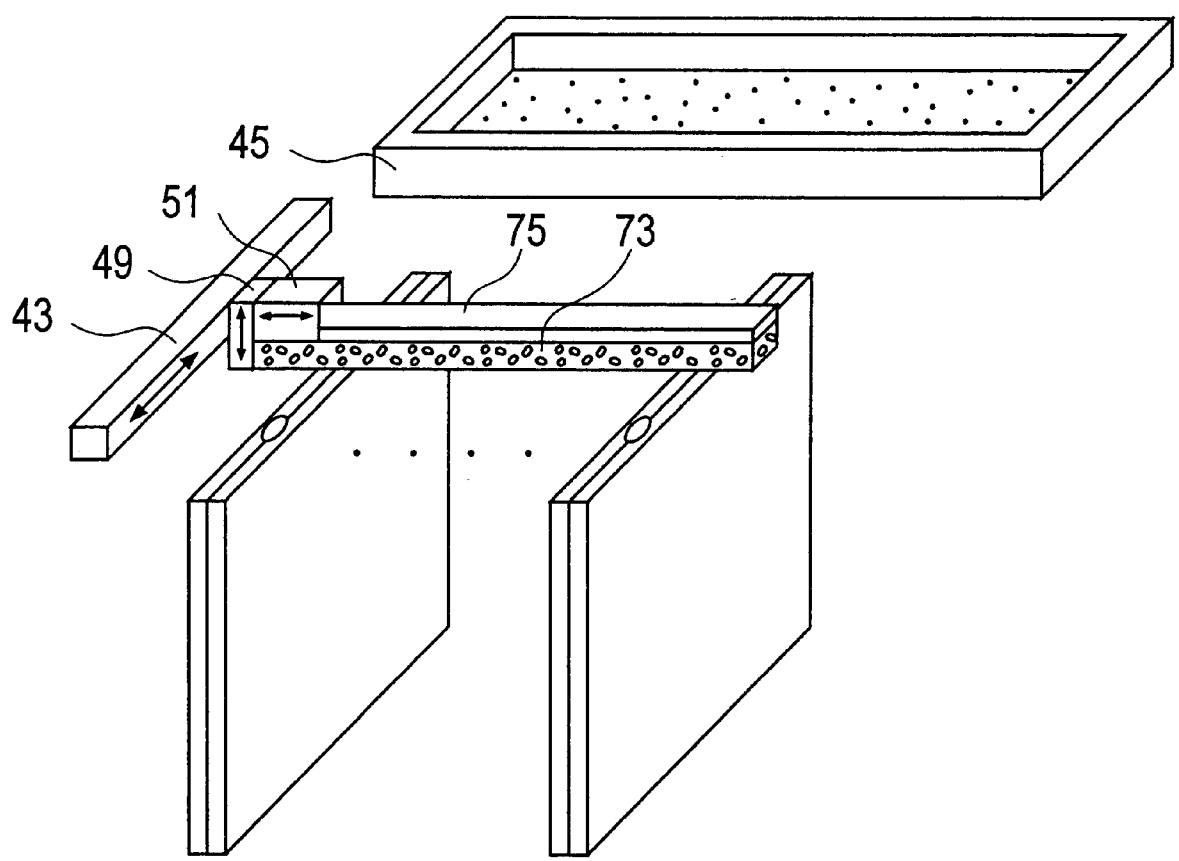
FIG. 11 is drawings depicting a liquid crystal sealing device in accordance with the fourth embodiment.

In the above-mentioned third embodiment, the porous element 73 is disposed at the tip of the pin 41 for pin transfer. However, for the porous element 73, as FIG. 11 shows, a porous element 73 having a shape which covers the sealing area R of a multiplicity of liquid crystal cells, may be used, where this porous element 73 is fixed to the support element 75, and the support element 75 is fixed to the micro-motion mechanism 51.

The fourth embodiment can also obtain effects similar to the effect of the third embodiment.

In the fourth embodiment, the porous element 73 may be attached for each part facing the sealing areas R of the multiplicity of liquid crystal cells of the support element 75, instead of attaching one long porous element 73.

5. Other Embodiments

In the above mentioned third embodiment and fourth embodiment, examples of simultaneously sealing the liquid crystal injection holes of the multiplicity of liquid crystal cells were described. However, the concept of using the porous element and utilizing the drawing phenomenon of the sealing material can certainly be applied to a liquid crystal sealing device which seals one liquid crystal cell at a time. The configuration and sealing operation is the same as the configuration and basic operation which were described with reference to FIG. 9 and FIGS. 10(A)–10(C), except that the number of target sealing liquid crystal cells is one, therefore a detailed explanation is omitted.

In the above description, embodiments of the present invention were described, but the present invention is not limited to the above embodiments, and multiplicity of variations and modifications are possible.

In the example in FIG. 1, for example, a multiplicity of liquid crystal cells are arranged in a row, and sealing material is supplied to these sealing areas R simultaneously. However, a multiplicity of liquid crystal cells may be arranged in two or more rows where the sealing material is supplied to the sealing areas R thereof simultaneously. In other words, the device configuration can be such that the pins are arranged in two or more rows in a predetermined way.

As described above, the present invention can provide a new liquid crystal sealing device which supplies the sealing material to each sealing area of the multiplicity of liquid crystal cells simultaneously by pin transfer.

What is claimed is:

1. A liquid crystal sealing device for sealing liquid crystal injection holes of a plurality of liquid crystal cells with a sealing material that is stored in a container, said liquid crystal sealing device comprising:

a sealing material supply part operable to supply the sealing material simultaneously to sealing areas for sealing the liquid crystal injection holes of the plurality of liquid crystal cells, said sealing material supply part comprising:

a plurality of pins arranged to match an arrangement of the sealing areas of the plurality of liquid crystal cells, each of said plurality of pins being operable to transfer the sealing material from the container to a corresponding sealing area of a respective one of the plurality of liquid crystal cells, a reciprocating mechanism operable to reciprocate said plurality of pins as one unit between a position where the sealing areas are to be positioned and the container, and a vertical micro-motion mechanism operable to move each of said plurality of pins vertically with respect to a position, the position being a central point where the sealing material can be attached to the corresponding sealing area.

2. A liquid crystal sealing device according to claim 1, wherein said vertical micro-motion mechanism is operable to minutely move said plurality of pins as one unit.

3. A liquid crystal sealing device for sealing liquid crystal injection holes of a plurality of liquid crystal cells with a sealing material that is stored in a container, said liquid crystal sealing device comprising:

a sealing material supply part operable to supply the sealing material simultaneously to sealing areas for sealing the liquid crystal injection holes of the plurality of liquid crystal cells, said sealing material supply part comprising:

a plurality of pins arranged to match an arrangement of the sealing areas of the plurality of liquid crystal cells, each of said plurality of pins being operable to transfer the sealing material from the container to a corresponding sealing area of a respective one of the plurality of liquid crystal cells,
a reciprocating mechanism operable to reciprocate said plurality of pins as one unit between a position where the sealing areas are to be positioned and the container, and
a horizontal micro-motion mechanism operable to move each of said plurality of pins horizontally with respect to a position, the position being a central point where the sealing material can be attached to the corresponding sealing area.

4. A liquid crystal sealing device for sealing liquid crystal injection holes of a plurality of liquid crystal cells with a sealing material that is stored in a container, said liquid crystal sealing device comprising:
a sealing material supply part operable to supply the sealing material simultaneously to sealing areas for sealing the liquid crystal injection holes of the plurality of liquid crystal cells, said sealing material supply part comprising:
a plurality of pins arranged to match an arrangement of the sealing areas of the plurality of liquid crystal cells, each of said plurality of pins being operable to transfer the sealing material from the container to a corresponding sealing area of a respective one of the plurality of liquid crystal cells,
a reciprocating mechanism operable to reciprocate said plurality of pins as one unit between a position where the sealing areas are to be positioned and the container,
a vertical micro-motion mechanism operable to move each of said plurality of pins vertically with respect to a position, the position being a central point where the sealing material can be attached to the corresponding sealing area, and
a horizontal micro-motion mechanism operable to move each of said plurality of pins horizontally with respect to the position.

5. A liquid crystal sealing device for sealing liquid crystal injection holes of a plurality of liquid crystal cells with a sealing material that is stored in a container, said liquid crystal sealing device comprising:
a sealing material supply part operable to supply the sealing material simultaneously to sealing areas for sealing the liquid crystal injection holes of the plurality of liquid crystal cells, said sealing material supply part comprising:
a plurality of pins arranged to match an arrangement of the sealing areas of the plurality of liquid crystal cells, each of said plurality of pins having a tip and being operable to transfer the sealing material from the container to a corresponding sealing area of a respective one of the plurality of liquid crystal cells by said tip contacting the respective one of the plurality of liquid crystal cells, wherein each of said plurality of pins comprises a buffering mechanism operable to insure contact between said pin and the respective one of the plurality of liquid crystal cells when said pin is in a state to contact the respective one of the plurality of liquid crystal cells and said buffering mechanism further operable to relax an interaction between said pin and the respective one of the plurality of liquid crystal cells, and
a reciprocating mechanism operable to reciprocate said plurality of pins as one unit between a position where the sealing areas are to be positioned and the container.

6. A liquid crystal sealing device for sealing liquid crystal injection holes of a plurality of liquid crystal cells with a sealing material that is stored in a container, wherein each of the plurality of liquid crystal cells comprises two substrates, said liquid crystal sealing device comprising:
a sealing material supply part operable to supply the sealing material simultaneously to sealing areas for sealing the liquid crystal injection holes of the plurality of liquid crystal cells, said sealing material supply part comprising:
a plurality of pins arranged to match an arrangement of the sealing areas of the plurality of liquid crystal cells, each of said plurality of pins being operable to transfer the sealing material from the container to a corresponding sealing area of a respective one of the plurality of liquid crystal cells,
a reciprocating mechanism operable to reciprocate said plurality of pins as one unit between a position where the sealing areas are to be positioned and the container,
a vertical micro-motion mechanism operable to move each of said plurality of pins vertically with respect to a position, the position being a central point where the sealing material can be attached to the corresponding sealing area, and
a substrate pressure adjustment mechanism operable to adjust pressure used to press the two substrates of each of the plurality of liquid crystal cells so that the sealing material is drawn into the liquid crystal injection holes of the plurality of liquid crystal cells when the sealing material is in contact with the sealing areas of the plurality of liquid crystal cells via said plurality of pins, wherein said reciprocating mechanism operates such that the sealing material is in contact with the sealing areas via said plurality of pins during a time when a required quantity of the sealing material is drawn in the liquid crystal injection holes and the contact is then released.

7. A liquid crystal sealing device for sealing liquid crystal injection holes of a plurality of liquid crystal cells with a sealing material wherein each of the plurality of liquid crystal cells comprises two substrates, said liquid crystal sealing device comprising:
a sealing material supply part operable to supply the sealing material simultaneously to sealing areas for sealing the liquid crystal injection holes of the plurality of liquid crystal cells, said sealing material supply part comprising:
a plurality of pins having tips, said plurality of pins being arranged to match an arrangement of the sealing areas of the plurality of liquid crystal cells, each of said plurality of pins being operable to transfer the sealing material from the container to a corresponding sealing area of a respective one of the plurality of liquid crystal cells,
a porous element operable to be impregnated with the sealing material, said porous element having elasticity and being located at said tips of said plurality of pins,
a reciprocating mechanism operable to reciprocate said plurality of pins as one unit between a position where the sealing areas are to be positioned and the container,
a vertical micro-motion mechanism operable to move each of said plurality of pins vertically with respect to a position, the position being a central point where the sealing material can be attached to the corresponding sealing area, and a substrate pressure adjustment mechanism operable to adjust pressure used to press the two substrates of each of the plurality of liquid crystal cells so that the sealing material in said porous element is drawn into the liquid crystal injection holes of the plurality of liquid crystal cells when said porous element is in contact with the sealing areas of the plurality of liquid crystal cells, wherein said reciprocating mechanism operates such that said porous element is in contact with the sealing areas during a time when a required quantity of the sealing material is drawn in the liquid crystal injection holes and the contact is then released.

8. A liquid crystal sealing device for sealing liquid crystal injection holes of a plurality of liquid crystal cells with a sealing material, wherein each of the plurality of liquid crystal cells comprises two substrates, said liquid crystal sealing device comprising:

a sealing material supply part operable to supply the sealing material simultaneously to sealing areas for sealing the liquid crystal injection holes of the plurality of liquid crystal cells, said sealing material supply part comprising:

a porous element operable to be impregnated with the sealing material, said porous element having elasticity and being arranged to match an arrangement of the sealing areas of the plurality of liquid crystal cells, a substrate pressure adjustment mechanism operable to adjust pressure used to press the two substrates of each of the plurality of liquid crystal cells so that the sealing material in said porous element is drawn into the liquid crystal injection holes of the plurality of liquid crystal cells when said porous element is in contact with the sealing areas of the plurality of liquid crystal cells, and a porous element moving element mechanism operable to move said porous element such that said porous element is in contact with the sealing areas during a time when a required quantity of the sealing material is drawn from said porous element into the liquid crystal injection holes and the contact is then released.

9. A liquid crystal sealing device for sealing a liquid crystal injection hole of a liquid crystal cell with a sealing material, wherein the liquid crystal cell comprises two substrates, said liquid crystal sealing device comprising:

a sealing material supply part operable to supply the sealing material to a sealing area for sealing the liquid crystal injection hole of the liquid crystal cell, said sealing material supply part comprising:

a porous element operable to be impregnated with the sealing material, said porous element having elasticity, a substrate pressure adjustment mechanism operable to adjust pressure used to press the two substrates of the liquid crystal cell so that the sealing material in said porous element is drawn into the liquid crystal injection hole of the liquid crystal cell when said porous element is in contact with the sealing area of the liquid crystal cell, and a porous element moving element mechanism operable to move said porous element such that said porous element is in contact with the sealing area during a time when a required quantity of the sealing material is drawn from said porous element into the liquid crystal injection hole and the contact is then released.

* * * * *